Oct. 12, 1971   E. J. NOBACH   3,611,535
METHOD OF MAKING VEHICLE WHEEL
Original Filed June 6, 1968   4 Sheets-Sheet 1

INVENTOR
EDWARD J. NOBACH

ATTORNEYS

Oct. 12, 1971  E. J. NOBACH  3,611,535
METHOD OF MAKING VEHICLE WHEEL
Original Filed June 6, 1968  4 Sheets-Sheet 3

INVENTOR
EDWARD J. NOBACH

Barnes, Kisselle, Raisch & Choate
ATTORNEYS

Oct. 12, 1971 — E. J. NOBACH — 3,611,535
METHOD OF MAKING VEHICLE WHEEL
Original Filed June 6, 1968 — 4 Sheets-Sheet 4

INVENTOR
EDWARD J. NOBACH

ATTORNEYS

United States Patent Office 3,611,535
Patented Oct. 12, 1971

3,611,535
METHOD OF MAKING VEHICLE WHEEL
Edward J. Nobach, Lansing, Mich., assignor to Motor Wheel Corporation, Lansing, Mich.
Original application June 6, 1968, Ser. No. 735,039, now Patent No. 3,506,311, dated Apr. 14, 1970. Divided and this application Jan. 14, 1970, Ser. No. 2,781
Int. Cl. B21h 1/10; B21k 1/38
U.S. Cl. 29—159.01                 6 Claims

ABSTRACT OF THE DISCLOSURE

An automotive passenger vehicle wheel comprising a cast aluminum wheel body and a rolled or stamped sheet steel rim rigidly interconnected by a steel ring insert cast into the aluminum body and a continuous welded joint between the steel insert and the rim, the welded joint preferably being formed by a friction or inertial welding process wherein one edge of the rim is rotated against the ring insert.

---

This application is a division of application Ser. No. 735,039, filed June 6, 1968, and entitled "Vehicle Wheel," now U.S. Pat. No. 3,506,311.

An object of the present invention is to provide an improved wheel construction of the automotive passenger vehicle type which embodies a rugged, heavy section cast aluminum or magnesium disc or body, such as that employed in high performance racing wheels, which may be readily made with deep three dimensional contours to impart a pleasing ornamental appearance to the wheel, combined with the economy, flexibility and strength of a steel rim which is securely joined to the inboard side of the body so as to be hidden from view when a pneumatic tire is mounted on the wheel, thereby resulting in a unitary vehicle wheel assembly of pleasing appearance, high strength and economical construction.

A further object to provide a wheel of the above character in which the interface at the union of the body and rim parts is composed of like metals, preferably ferrous, to thereby facilitate welding the two parts together.

Another object is to provide a wheel of the above character in which the light metal disc or body is securely joined to the steel rim by a continuous welded joint produced by a friction or inertial welding process to provide a high strength, reliable and low cost union of the wheel parts.

Another object is to provide an economical and reliable method for making a wheel of the above character.

Other objects as well as features and advantages of the present invention will become apparent from the following detailed description taken in conjunction with the accompanying drawings wherein.

Figure 1:
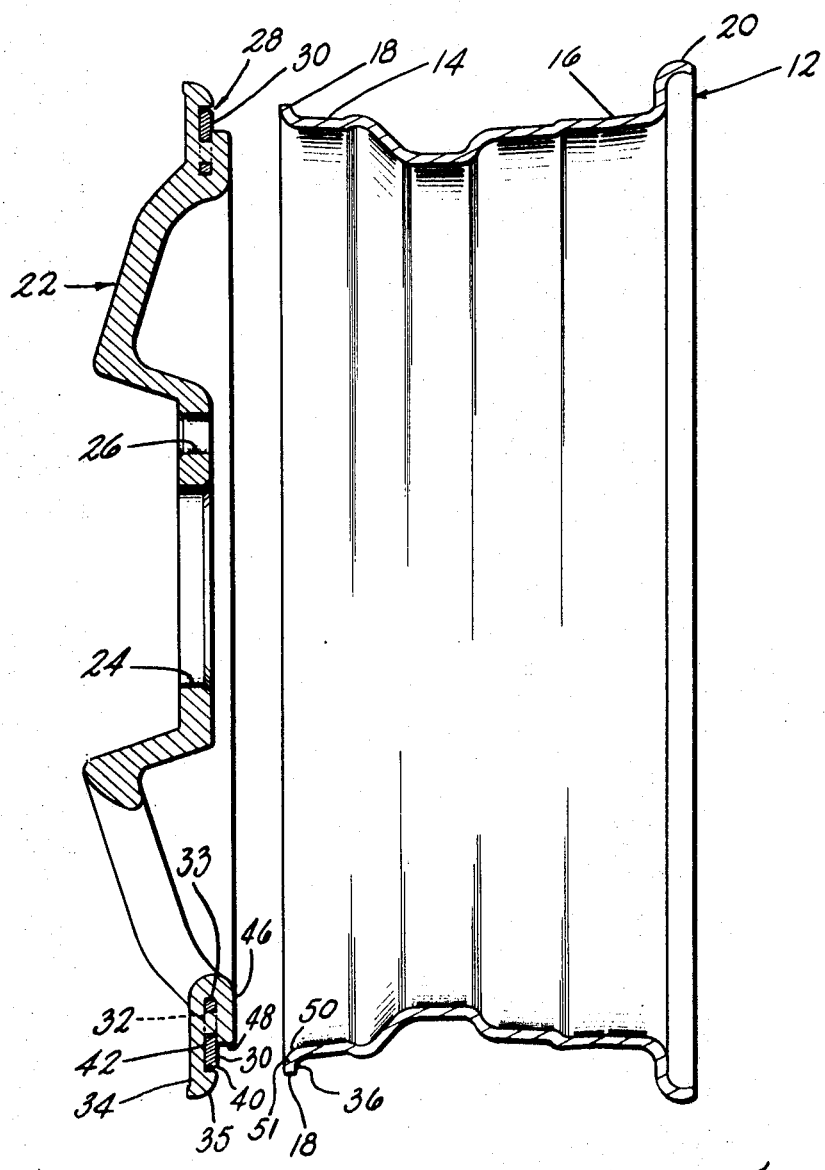
FIG. 1 is an exploded view of a wheel body and wheel rim spaced apart but juxtaposed for joinder into one embodiment of a complete wheel assembly in accordance with the present invention, both parts being shown in vertical center section through the rotational axes of the parts.
Figure 2:
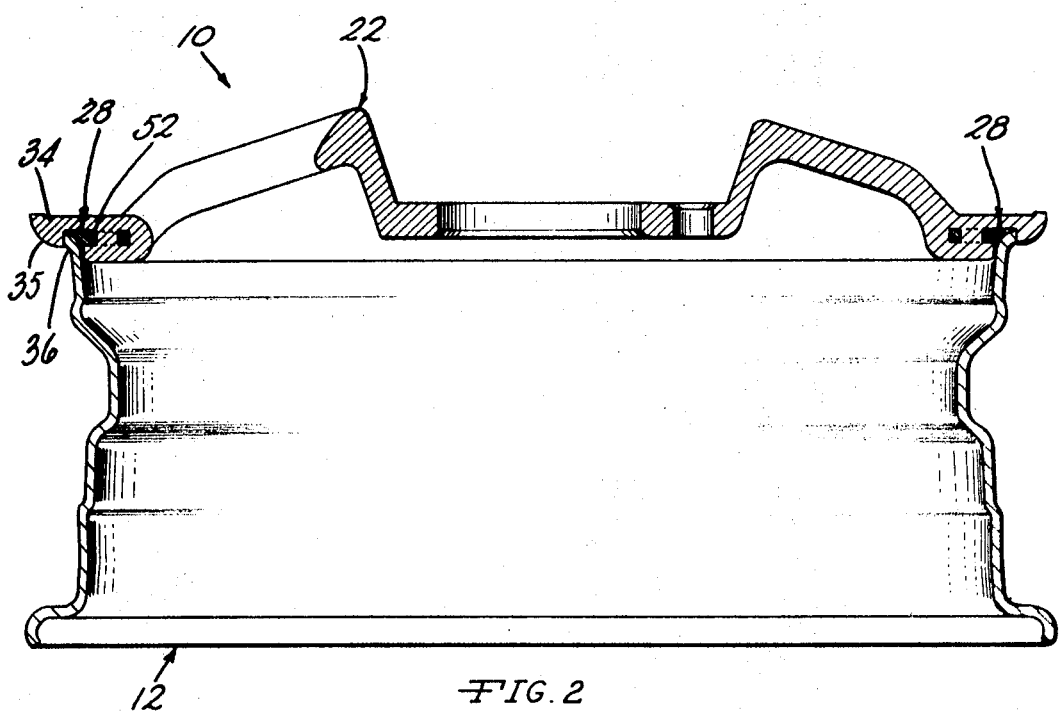
FIG. 2 is a center sectional view similar to that of FIG. 1, taken on the line 2—2 of FIG. 3, illustrating the completed wheel assembly after the body has been united with the rim.
Figure 3:
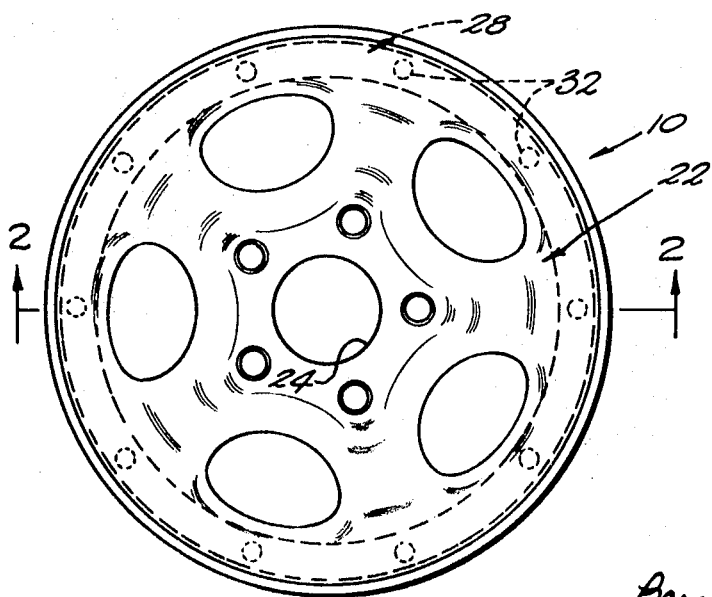
FIG. 3 is a side elevational view of the wheel assembly of FIG. 2, but shown on a reduced scale and looking at the outboard side of the wheel.

Referring in more detail to the accompanying drawings, one embodiment of a wheel 10 and method for making the same in accordance with the present invention is shown in FIGS. 1, 2 and 3. Wheel 10 comprises a conventional drop-center type sheet steel rim 12 which may be made by conventional rim roll forming machinery. Thus rim 12 has the usual left and right hand tire bead receiving seats 14 and 16 (as viewed in FIG. 1). However, the outboard tire bead retaining flange 18 is cut-off close to seat 14 to given diameter less than that of the full inboard flange 20 associated with seat 16.

Wheel 10 also includes an apertured wheel body or disc 22 which may have various shapes and contours intermediate its inner and outer peripheries but which in almost all instances will contain a large central aperture 24 through which the usual axle may protrude. Five holes 26 (FIGS. 1 and 3) extend axially through disc 22 in a concentric array about aperture 24 so that mounting bolts extending from a vehicle axle flange (not shown) may project through holes 26 to fasten the wheel to the flange.

In accordance with the method of the present invention, disc 22 is cast either statically in a permanent or sand mold or centrifugally to the configuration shown in FIGS. 1 and 2, preferably from a non-ferrous light metal such as magnesium, aluminum or structural alloys thereof. Prior to pouring of the molten metal into the mold, a welding anchor in the form of a continuous ring 28 made of low carbon steel is supported in the mold as by resting its inboard radial face 30 on the complemental corresponding face of the mold (not shown). Ring 28 is provided with a series of circular or other suitably shaped apertures 32 which extend in a circular row (FIG. 2) axially through the ring between the median diameter and inner periphery 33 of the ring (FIG. 1). Holes 32 are thus disposed within the portion of ring 28 which is subsequently engulfed by the molten aluminum or other light metal which is poured into the mold cavity, the molten aluminum flowing through holes 32 to anchor ring 28 securely but mechanically in place.

Preferably the outer periphery of disc 22 is contoured so as to have a peripheral marginal portion 34 contoured on its inboard side 35 to form a smooth continuation of the concavely curved inner face 36 of flange 18 when, as best seen in FIG. 2, flange 18 and insert 30 are united as described hereinafter. Only the outer exposed portion of face 30 of ring 28 is fully exposed in the finished casting, but a slight radial clearance 40 may, if desired, be provided between the outer periphery or ring 28 and portion 34. The outboard face 42 of insert ring 28 is completely covered by aluminum, being disposed slightly axially inset from the inboard aluminum face 35 of marginal portion 34. The inboard face 46 of disc 22 extends from radially inwardly of ring 28 outwardly in radially overlapping relation with insert 28 and terminates at an axially extending cylindrical face 48 which intersects face 30 of insert ring 28 radially outwardly of anchoring holes 32. As best seen in FIG. 2, the outside diameter of face 48 is approximately the same as the inside diameter of bead seat 14 of rim 12 where it meets flange 18, and hence radius 50 at the junction of seat 14 and flange 18 may be axially aligned with the exposed face 30 of ring 28 as shown in FIG. 1.

In the next step of the method of the invention, the finished disc 22 and rim 12 are mounted in juxtaposed relation as indicated in FIG. 1 on a suitable friction welding machine, such as that disclosed in U.S. Pat. 3,273,233. Discs 22 and rim 12 are then rotated relative to one another, either with one or the other of the parts stationary or counter-rotated as set forth in more detail in the aforesaid patent. Disc 22 and rim 12 are then engaged under pressure while so rotated, thereby frictional slidably engaging surface 30 with the outer surface 51 of flange 18, causing these engaged surfaces to be rapidly heated to a high temperature. During this process of friction plastic working produced by relative motion at the engaged surfaces, the surface 30 of ring 28 is worn and fused away so that surface 35 of disc portion 34 and the adjacent disc surface 36 blend into a smooth curve generally matching that of the interior surface of flange 20 and seat 16 of the rim as best seen in FIG. 2. A very strong metallurgical bond of the type described in the aforesaid patent is thereby formed at the weld interface 52 of insert 28 and rim 12 so that the rim is securely united by a circumferentially continuous friction weld with disc 22.

The completed wheel assembly 10 and method of making the same as described above are advantageous in that, in addition to the advantages of friction welding set forth in the aforesaid patent, a more accurate axial alignment and concentricity of the disc and rim parts as well as a stronger wheel assembly are obtained due to the nature of the rotatable fixturing of the friction welding machine for holding the parts during friction welding, particularly when compared to the difficulties encountered in this phase of conventional spot or arc welding procedures and equipment hitherto employed in wheel manufacturing. Also, since the heat generated during friction welding is more localized at interface 52, and since it is also generated simultaneously around the entire periphery of the disc, there is much less heat induced distortion during welding as compared to arc or spot welding.

The provision of the steel insert ring 28 insures a steel-to-steel fusion welded bond with rim 12, eliminating the problems of joinder of the dissimilar aluminum and steel materials of the major wheel parts. The fact that the outer corner of insert 28 near the juncture of faces 35 and 30 is smeared and fused onto the adjacent aluminum face 48 during the friction welding process eliminates the need for any finish machining on the casting or insert prior to being juxtaposed with the rim for friction welding, i.e., this contouring or matching of the mating surfaces is accomplished by the frictional engagement and plasticity imparted to the parts during the friction welding process.

With the joint configuration of disc 22, a strong supporting union is effected between disc 22 and rim 12 at the outboard margin of the rim as contrasted with the usual union of the disc to the center well of a drop center wheel rim. This joinder of the disc to the outboard bead seat of the rim provides a greater clearance between the wheel assembly 10 and the brake drum, disc brake rotor or other brake structure (not shown) which are normally housed within the confines of the wheel assembly, thereby permitting these parts to be enlarged for greater braking power or providing greater air cooling clearance if conventional size brakes are employed.

Wheel assembly 10 and the aforementioned method of making same is also advantageous in that disc 22 may be made as a heavy section high strength cast member from light metals such as aluminum or magnesium in a variety of ornamental designs due to the deep, three dimensional contours obtainable by a casting process as compared to a conventional stamping or deep drawing processes and with a much lower tooling cost. Hence the outboard configuration, augmented as desired by chrome plating or other integrated ornamentation, of disc 22 can be made sufficiently aesthetically pleasing in appearance to eliminate the need for the usual removable wheel cover. The heavy wall thickness of the cast disc is offset by the use of light metal alloys which keep the overall weight of the wheel within acceptable limits. Since rim 12 forms a component of the wheel assembly which is entirely hidden from the view when the tire is mounted on the wheel and disc 22 is joined to the rim to cover its outboard face, the rim may be rolled from steel to a standard, conventional configuration and thus can be made on existing rim manufacturing equipment at low cost.

If desired, the configuration of ring insert 28 may be modified so that anchoring apertures 32 are replaced by a circumferentially alternating series of radial notches and radially inwardly extending projections along the inner periphery of the insert to provide a torque lock engagement with the aluminum material of the disc which is cast about the insert. Insert ring 28 may also be made circumferentially discontinuous, as by providing a parting gap, if greater radial expansion and contraction of the inserts during the casting stage is desired.

Figure 4:
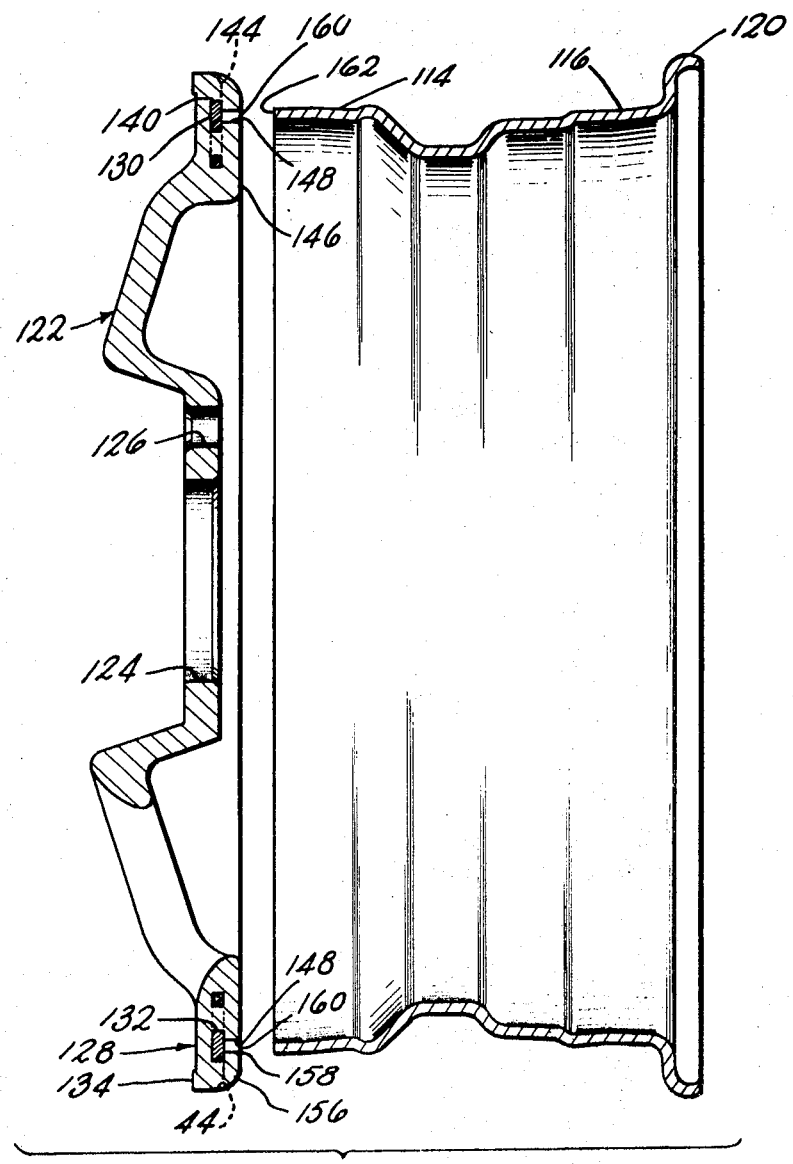
FIG. 4 is an exploded view of a modified wheel assembly also made in accordance with the present invention, the body and rim parts being shown spaced apart but juxtaposed for assembly similar to the illustration in FIG. 1.
Figure 5:
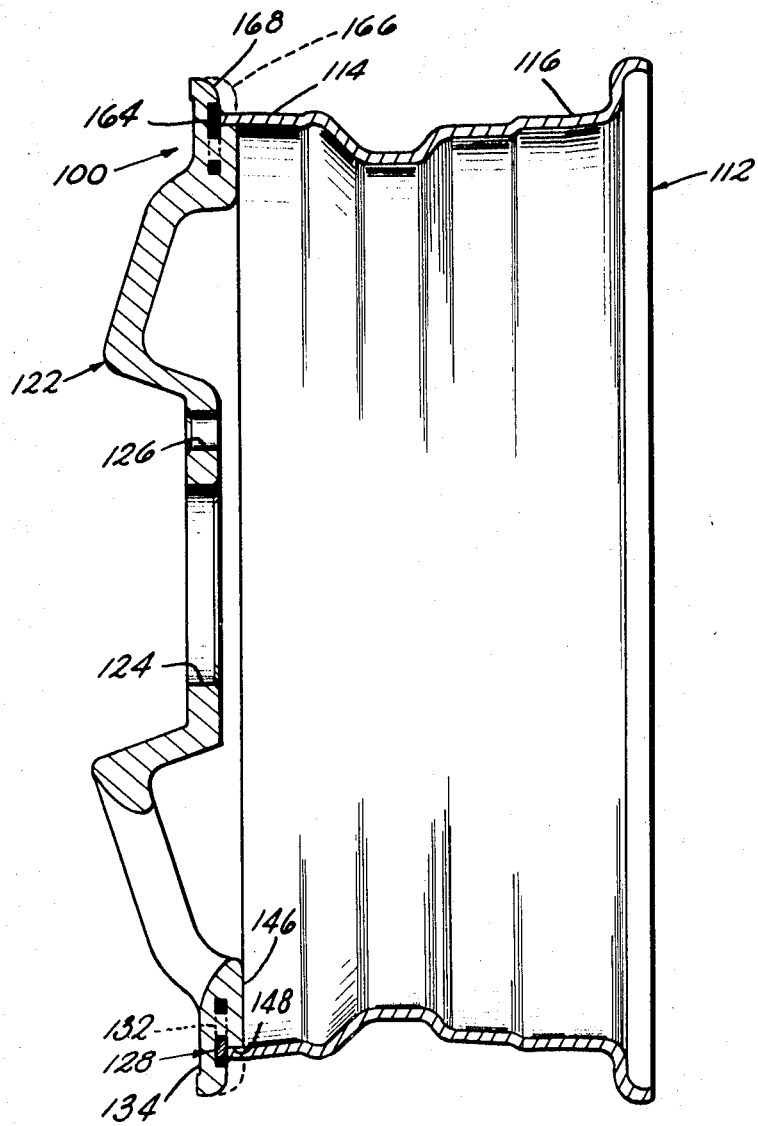
FIG. 5 is a vertical center sectional view through the rotational axis of the modified wheel assembly of FIG. 4 after the body and rim have been united and a finishing machining operation, performed to complete the wheel assembly.

Referring to FIGS. 4 and 5, a modified wheel assembly 100 and modified method of manufacturing the same also in accordance with the present invention is illustrated, the finished wheel assembly 100 being shown in FIG. 5. In these figures, those elements corresponding to elements described previously in conjunction with wheel assembly 10 are given like reference numerals but raised by a factor of 100.

Wheel assembly 100, like wheel 10, consists of two principal parts, a cast aluminum disc or body 122 and a roll formed steel rim 112. Disc 122 as cast (FIG. 4) is similar to disc 22 except around the outer peripheral margin thereof due to a steel ring insert 128 being completely imbedded within the cast aluminum peripheral portion 134 of body or disc 122. Hence, both the outer peripheral face 140 and the inboard radial face 130 of insert 128 are initially covered by an annular mass 156 of aluminum, as indicated in FIG. 4 by the additional material disposed inboard of an imaginary line 44 corresponding to face 44 of disc 22 described previously. Mass 156 thus overlaps insert 128 and extends radially inwardly to a cylindrical surface 158 which together with the cylindrical surface 148 defines an annular groove 160 which extends from the inboard radial face 146 of disc 122 axially to the inboard radial face 130 of insert 128. Groove 160 may be made during the casting process by inserting an annular ring-like core (not shown) in the mold cavity which also serves as a seat to support insert 128 in the mold prior to pouring the molten metal. Alternatively, groove 160 may be machined in the inboard face 146 of insert 122 subsequent to casting thereof but prior to assembly with rim 112.

Rim 112, like rim 12 described previously, may be made from low carbon steel on conventional rim roll forming equipment. However, rim 112 differs from rim 12 in having only one tire bead retaining flange, the inboard flange 120. The outboard end rim 112 constitutes the axially extending outboard bead seat 114 which terminates at a radial surface 162 disposed at the outer edge of the rim. Preferably, rim 112 is roll formed as a double width, double rimmed part with the two parts being symmetrical about the center line along which the initial dual-rim member is split by a roller cutter to form two rims 112 wherein the parting line becomes the outboard end edge 162 of each rim.

Disc 122 and rim 112 are dimensioned so that seat portion 114 of the rim has a close clearance fit in groove 160 of disc 122 when these two wheel parts are juxtaposed for friction welding joinder thereof in the manner of wheel 10 described previously, as indicated in FIG. 4. However, due to the fact that edge 162 is confined within groove 160 as it is pressed and rotated against side face 130 of insert 138, weld flash is confined within groove 160 during the welding process. The friction welded fusion of insert 128 to rim 112 occurs at the interface 164 (FIG. 5) and provides a secure, high strength union of these parts in a minimum of time. After the parts have been joined and cooled the aluminum section 156 is machined away, as indicated by the material removed between the broken and solid lines 166 and 168 respectively of FIG. 5, to the curved face 168 on the inboard side of the marginal portion 134 of disc 122 which thereafter forms the outboard tire bead retaining flange of wheel 100. Thus, with wheel 100 none of the material of rim 112 is exposed to view from the outboard side of the vehicle when a tire is mounted on the wheel. The machining operation can be conveniently performed on the friction welding machine by providing a suitable tool holder, such as that on the usual engine lathe, so that double duty is obtained from the friction welding equipment.

From the foregoing description, it will now be apparent that the wheel and method of making the same in accordance with the invention fulfills the aforestated objects in providing a strong, light-weight and economical wheel assembly which can be readily mass produced in an efficient and reliable manner.

It is to be understood that the wheel assembly of the invention may also comprise disc 22 and a rim 112 with end surface 162 of rim 112 in welded engagement with side surface 30 of ring 28. Also, the method of making wheel assembly 100 may be varied by machining away the aluminum material 166 to form surface 168 prior to friction welding of the rim to the disc, although it is advantageous to have groove 160 in the friction welding step to help locate the end edge of the rim as well to trap and localize heat therein.

Another advantage of the wheel construction of the present invention is that the heavy sectioned disc 22 or 122, being made of aluminum, magnesium, alloys thereof or other light metal, provides a very efficient heat sink for intimate contact with steel insert 28 or 128 which rapidly conducts heat away from the weld area. This insures that the fusion surfaces remain relatively small and localized, and that a minimum of wear, melting or erosion of the steel parts as well as adjacent aluminum metal occurs during the friction welding process.

I claim:
1. A method of making a wheel assembly including a non-ferrous disc and a steel rim, comprising the steps of:
   (1) inserting in a disc mold adjacent the outer periphery of the mold cavity a steel ring having a radially extending surface with a portion thereof covered by a wall of the mold cavity to prevent engulfment thereof by molten metal in said cavity,
   (2) filling said mold with molten nonferrous metal,
   (3) allowing said molten metal to harden to form a disc and to unite said steel ring therewith,
   (4) removing said disc from said mold with said ring embedded therein, thereby separating said surface of said ring from said mold wall and exposing said surface of said ring insert,
   (5) bringing said disc into coaxial juxtaposition with a steel wheel rim having a circumferentially extending end surface aligned with said exposed surface of said ring insert, and
   (6) welding said rim to said steel ring insert at said ring and rim surfaces.

2. The method as set forth in claim 1 wherein said step (6) of welding said rim to said insert comprises engaging said exposed ring surface with said rim end surface and causing rotational rubbing contact under pressure to convert energy to heat at said surfaces while heating and working said surfaces to a temperature and a plastic condition at which a bond can be formed, concurrently reducing the speed of relative motion at said surfaces to a speed at which the workpieces can bond under the pressure and power input applied, forming the bond across the surfaces while the torque forces continue to produce relative motion between the workpieces, and continuing the application of the torque forces and relative rotation after the bond is formed for an amount of time sufficient to produce intense local working by plastically deforming the material across the bond and sufficient to forge and to eject coherent flash from the bond zone and to thereby impart an additional amount of energy into the bond zone, the total amount of energy being utilized in a single uninterrupted operation in which the torque forces and energy input are continuously maintained, both while the bond is being formed across said surfaces and after the bond is formed.

3. The method as set forth in claim 1 wherein step (6) comprises rotating said rim and disc relative to one another to effect a friction welding of said ring to said rim at said ring and rim surfaces.

4. The combination as set forth in claim 3 wherein said mold wall comprises a ring-like core adapted to form in said disc a peripheral margin having an annular groove therein extending from said radially extending surface of said ring axially to an inboard face of said disc, said step (5) comprising inserting said end edge of said rim in said groove to seat said rim and ring surfaces in contact whereby said friction welding between said surfaces takes place at the bottom of said groove.

5. The method as set forth in claim 4 further including the step of machining a portion of said peripheral margin of said disc disposed radially outwardly of said rim to form a bead retaining flange made up of said ring and the machined surface of said marginal portion of said disc.

6. The method as set forth in claim 1 wherein said mold wall comprises a portion of one of the walls defining the mold cavity contoured to receive said ring insert thereagainst so as to at least partially cover said radially extending surface of said insert, and said rim comprises a drop center rolled steel rim having an inboard tire bead retaining flange contiguous with the associated inboard bead seat of said rim and an outboard flange having an outside diameter less than that of said inboard flange, and wherein said step (6) comprises bringing the exposed surface of said ring into juxtaposition with said outboard flange along the exterior side thereof and squeezing said rim and disc axially toward one another to convert said ring to molten material and to shape said ring generally to the contour of said exterior surface of said outboard flange.

References Cited

UNITED STATES PATENTS

| | | | |
|---|---|---|---|
| 2,164,883 | 7/1939 | Moore | 301—65 X |
| 2,439,881 | 4/1948 | Ash | 301—65 X |
| 3,144,710 | 8/1864 | Hollander et al. | 29—470.3 |
| 3,235,312 | 2/1966 | Hollander | 301—159.1 X |
| 3,329,468 | 7/1967 | Beith | 301—65 X |

JOHN F. CAMPBELL, Primary Examiner

V. A. DI PALMA, Assistant Examiner

U.S. Cl. X.R.

29—470.3